United States Patent [19]

Shimokoshi et al.

[11] Patent Number: 5,308,221
[45] Date of Patent: May 3, 1994

[54] METHOD AND APPARATUS FOR CONTROLLING A ROBOT HAVING A FLOATING HAND

[75] Inventors: Akira Shimokoshi, Toyoake; Osamu Matsuda, Obu; Toshio Matsumura, Toyoake; Fumihiko Komuro, Aichi, all of Japan

[73] Assignees: Toyoda Koki Kabushiki Kaisha, Kariya; Toyota Jidosha Kabushiki Kaisha, Toyota, both of Japan

[21] Appl. No.: 27,599

[22] Filed: Mar. 5, 1993

Related U.S. Application Data

[63] Continuation of Ser. No. 736,500, Jul. 26, 1991, abandoned.

[30] Foreign Application Priority Data

Aug. 2, 1990 [JP] Japan .................. 2-205418

[51] Int. Cl.⁵ ............................................ B25J 9/18
[52] U.S. Cl. ............................ 414/734; 414/730; 414/786; 901/47
[58] Field of Search ........... 414/733, 734, 735, 737, 414/738, 745.7, 225, 226, 416, 786; 901/29, 40, 47

[56] References Cited

U.S. PATENT DOCUMENTS

| | | | |
|---|---|---|---|
| 3,986,007 | 10/1976 | Ruoff, Jr. .................. | 901/17 X |
| 4,146,924 | 3/1979 | Birk et al. .................. | 901/47 X |
| 4,187,051 | 2/1980 | Kirsch et al. ............... | 901/17 X |
| 4,305,130 | 12/1981 | Kelley et al. ............... | 414/737 X |
| 4,402,053 | 8/1983 | Kelley et al. ............... | 901/47 X |
| 4,412,293 | 10/1983 | Kelley et al. ............... | 901/9 X |
| 4,712,970 | 12/1987 | Nakamura et al. .......... | 901/47 X |
| 4,787,807 | 11/1988 | Spicher ...................... | 414/735 X |
| 4,909,376 | 3/1990 | Herndon et al. ............ | 414/736 X |

FOREIGN PATENT DOCUMENTS

| | | | |
|---|---|---|---|
| 59-173591 | 11/1984 | Japan . | |
| 60-19621 | 1/1985 | Japan ................ | 414/416 |
| 1-183395 | 7/1989 | Japan ................ | 414/225 |
| 1-205994 | 8/1989 | Japan ................ | 901/47 |
| 3-66587 | 3/1991 | Japan ................ | 901/47 |

OTHER PUBLICATIONS

Ruoff, C. F., "PACS-An Advanced Multitasking Robot System", *The Industrial Robot*, Jun. 1980, pp. 87-98.

Primary Examiner—Michael S. Huppert
Assistant Examiner—Donald W. Underwood
Attorney, Agent, or Firm—Oblon, Spivak, McClelland, Maier & Neustadt

[57] ABSTRACT

A robot system for taking out workpieces from a box using a robot having a floating hand and a workpiece recognition apparatus. The workpiece recognition apparatus detects the position and inclination of a selected workpiece, and calculates a target position and a desired inclined posture of the hand. The posture is so decided that a line of intersection of the floating plane of the hand with a vertical plane containing the longitudinal axis of the workpiece, becomes parallel to a horizontal direction, and the center axis of the wrist portion becomes perpendicular to the line of intersection. Data indicating the target position and the desired inclined posture are transmitted to the robot controller of the system, so that the controller drives the servomotors of the robot in such a way that the hand moves toward the target position with a desired inclined posture. With this operation, the hand contacts with the selected workpiece at a predetermined position to pick up the workpiece.

7 Claims, 11 Drawing Sheets

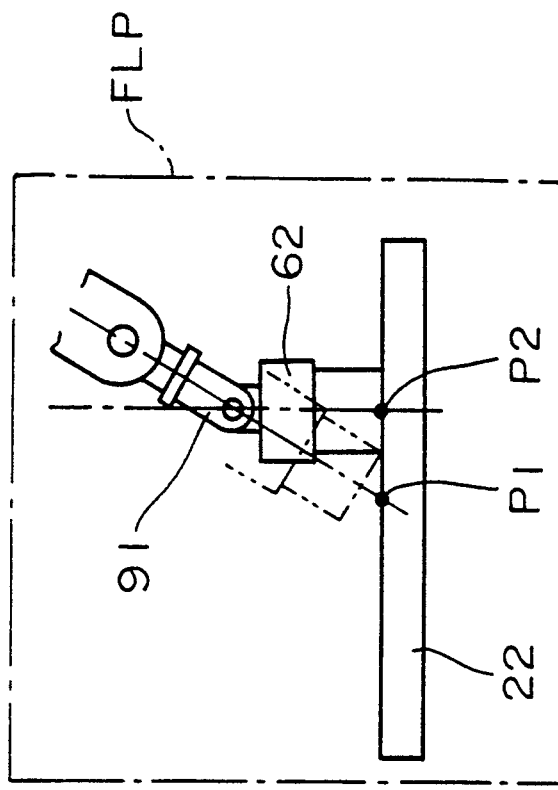
FIG. I(b) PRIOR ART
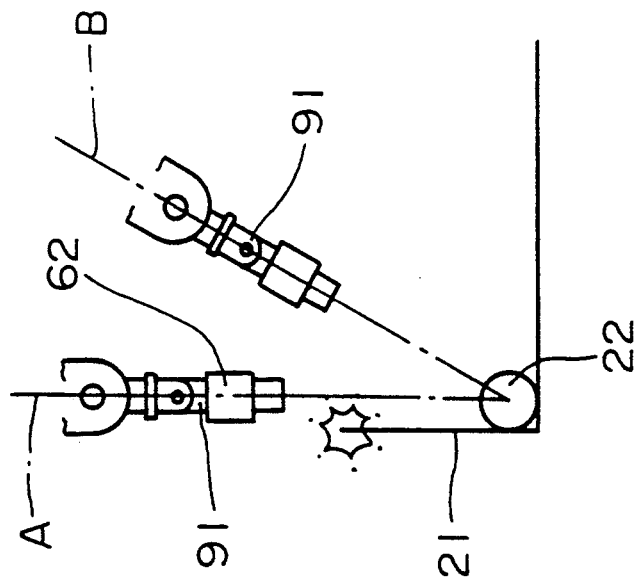
FIG. I(a) PRIOR ART

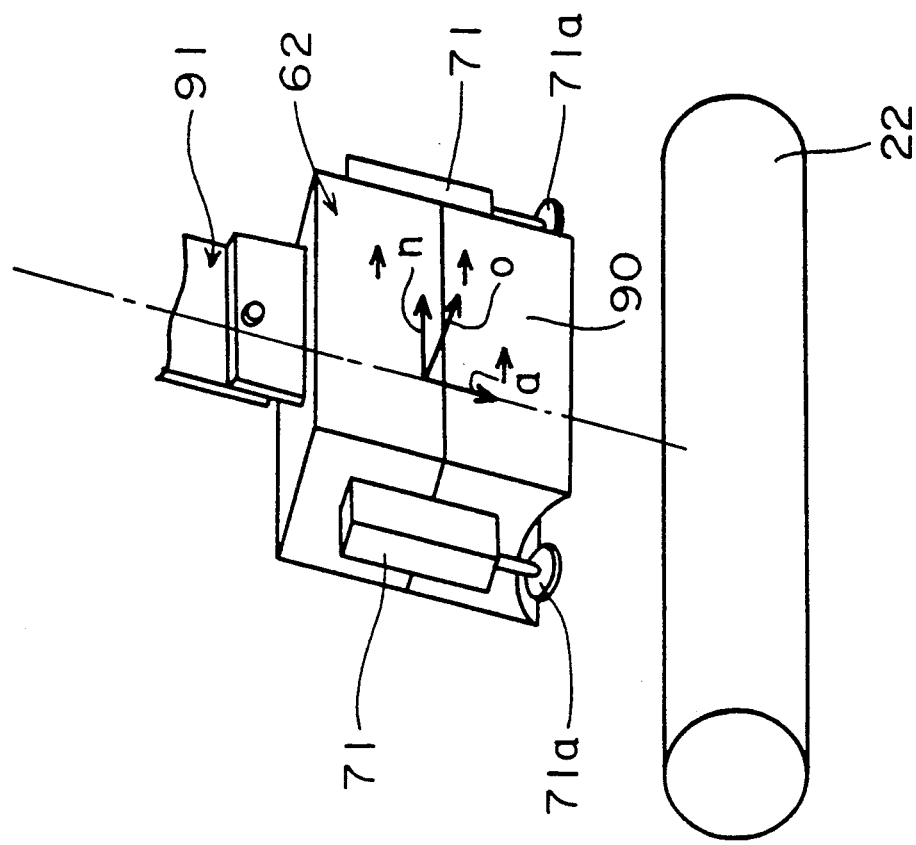
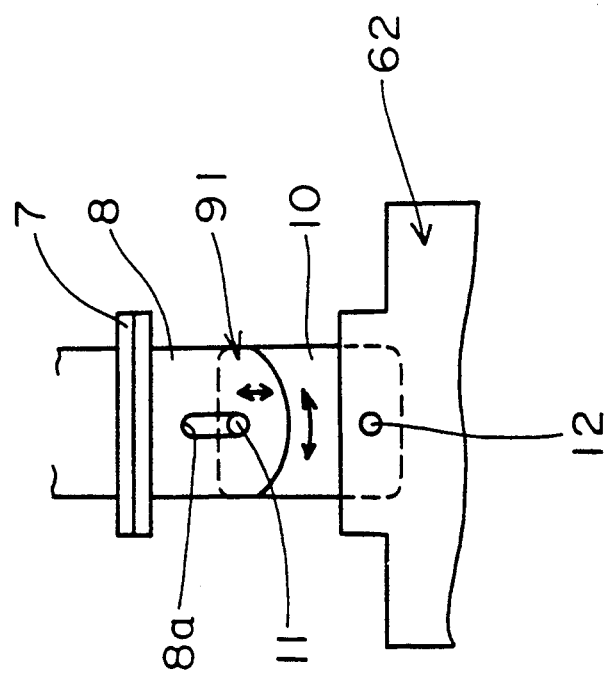
FIG. 3(a)
FIG. 3(b)

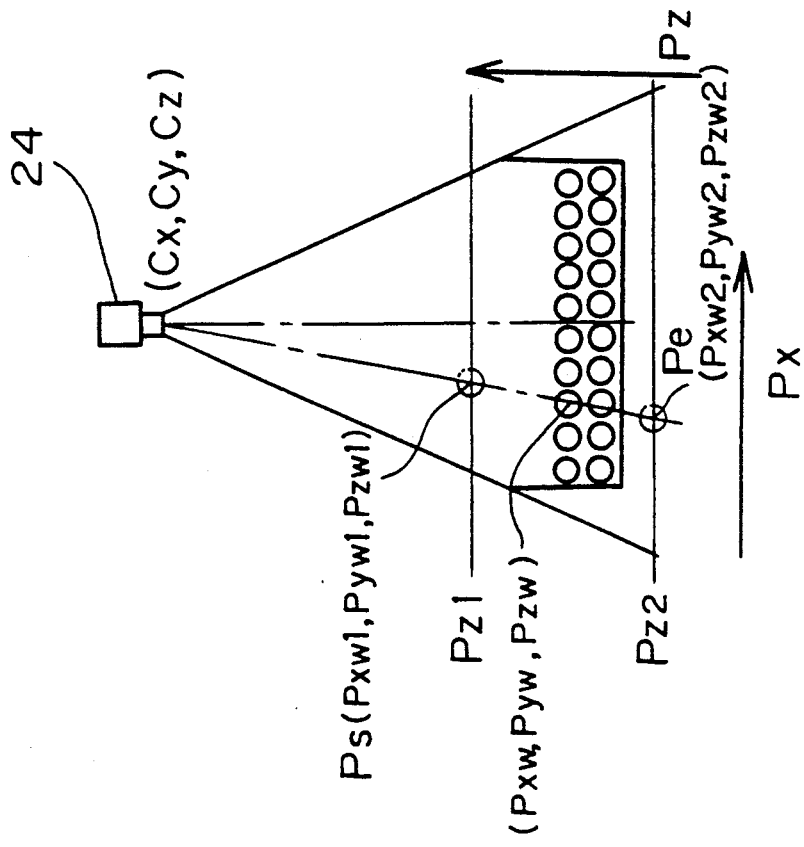
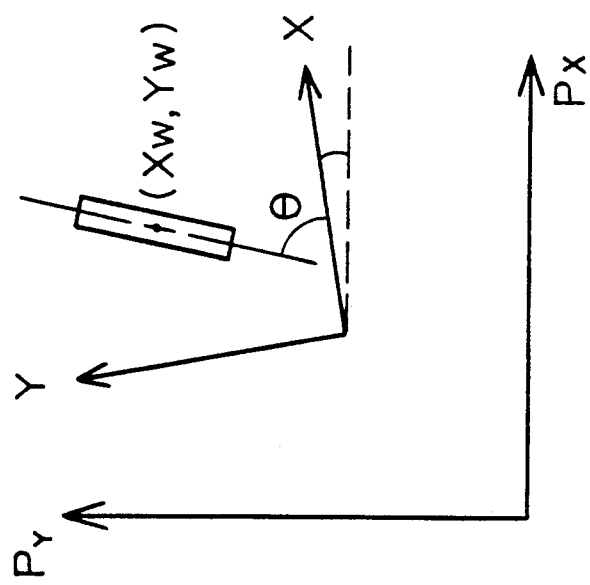
FIG. 4 (a)
FIG. 4 (b)

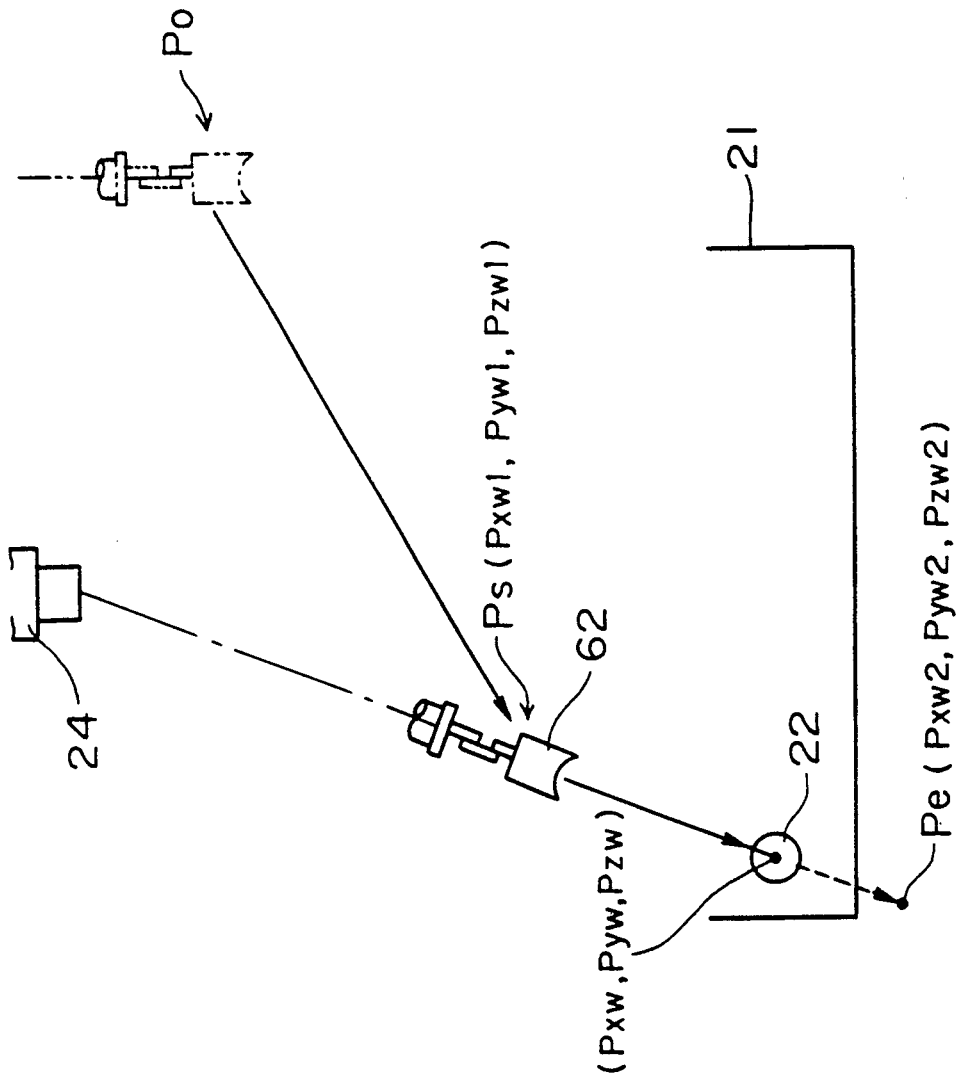

METHOD AND APPARATUS FOR CONTROLLING A ROBOT HAVING A FLOATING HAND

This application is a continuation of application Ser. No. 07/736,500, filed on Jul. 26, 1991, now abandoned.

BACKGROUND OF THE INVENTION

1. Field of the Invention

The present invention relates to a method and an apparatus for controlling a robot which has a floating hand for picking up a workpiece.

2. Discussion of the Prior Art

A robot having a floating hand is used to pick up workpieces which are piled up in a box. An example of such robot is disclosed in the Japanese utility model publication 59-173591. The robot is provided with a hand having an electric magnet, and the hand is attached to the wrist portion of the arm through a floating mechanism which allows the hand to swing in three dimensions. Using the floating hand, the workpieces can be picked up even if the postures of the workpieces are different from each other.

Such robot is also combined with a vision system to pick up workpieces. FIG. 1 (a) shows a method of picking up workpieces 22 from a box 21. During such picking up operation, the hand 62 interferes with a side wall of a box 21 when the robot picks up a workpiece 22 located near to the side wall of the box 21 by a downward movement of the hand 62 along a vertical direction A. Although this problem can be overcome by moving the hand 62 along an inclined direction B, the hand 62 may swing down from its center position, as indicated by a solid line in FIG. 1 (b), if the posture of the hand 62 is controlled taking no account of the direction of the floating plane FLP of the hand 62. This causes a position difference between a target holding position P1 and actual holding position P2 at which the workpiece is held. The position error then produces weight imbalance by which the workpiece may fall off from the hand 62.

SUMMARY OF THE INVENTION

Accordingly, it is an object of the present invention to provide an improved method and apparatus for controlling a robot which is capable of accurately positioning the hand of the robot even if the hand is floatably supported.

Another object of the present invention is to provide an improved method and apparatus for controlling a robot using a vision system to accurately position the floating hand.

Briefly, a method according to the present invention uses a robot having a floating hand to pick up a workpiece, wherein the hand is freely floatable in a floating plane parallel to the approach vector of a wrist portion of the robot. The method comprises steps of determining a desired approach posture of the wrist portion in such a way that said floating plane becomes parallel to a horizontal direction, changing the posture of the wrist portion such that the posture of the wrist portion coincides with the desired approach posture, and moving the hand toward the workpiece while keeping the desired posture to pick up the workpiece. With this method, the hand can approach the workpiece with a posture in which the line of intersection of the floating plane with a vertical plane is parallel to a horizontal direction, and the center axis of the wrist portion is perpendicular to the line of intersection. By approaching with this posture, the hand is prevented from swinging down from its center position even if gravity acts on the hand. Therefore, it becomes possible to hold the workpiece at a desired position.

The apparatus according to the present invention comprises means for achieving the above method to picks up a workpiece properly. In a preferred embodiment, the apparatus is combined with a workpiece recognition apparatus. In this case, the workpiece recognition apparatus detects a position and an inclination of the workpiece in a vision coordinate system. Thereafter, the detected position of the workpiece is converted into a position of the workpiece in a robot coordinate system, as a target position, and the hand is moved toward the target position with a desired approach posture to pick up the workpiece.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIGS. 1 (a) and 1 (b) are explanatory charts showing a conventional method of picking up a workpiece;

FIG. 2 is a block diagram of a robot control system according to a preferred embodiment of the present invention;

FIGS. 3 (a) and 3 (b) are enlarged views showing the structure of the hand shown in FIG. 2;

FIGS. 4 (a) and 4 (b) are explanatory charts showing the position and inclination of a workpiece;

FIGS. 5 and 6 are flowcharts showing the operation of the main CPU shown in FIG. 2;

FIGS. 7, 8 (a) and 8 (b) are flowcharts showing the operation of the image processing unit shown in FIG. 2;

FIGS. 9 (a) and 9 (b) are explanatory charts showing a base posture and an inclined posture of the hand shown in FIG. 2; and FIG. 10 shows an explanatory chart showing a picking up operation.

DETAILED DESCRIPTION OF THE PREFERRED EMBODIMENT

Figure 2:
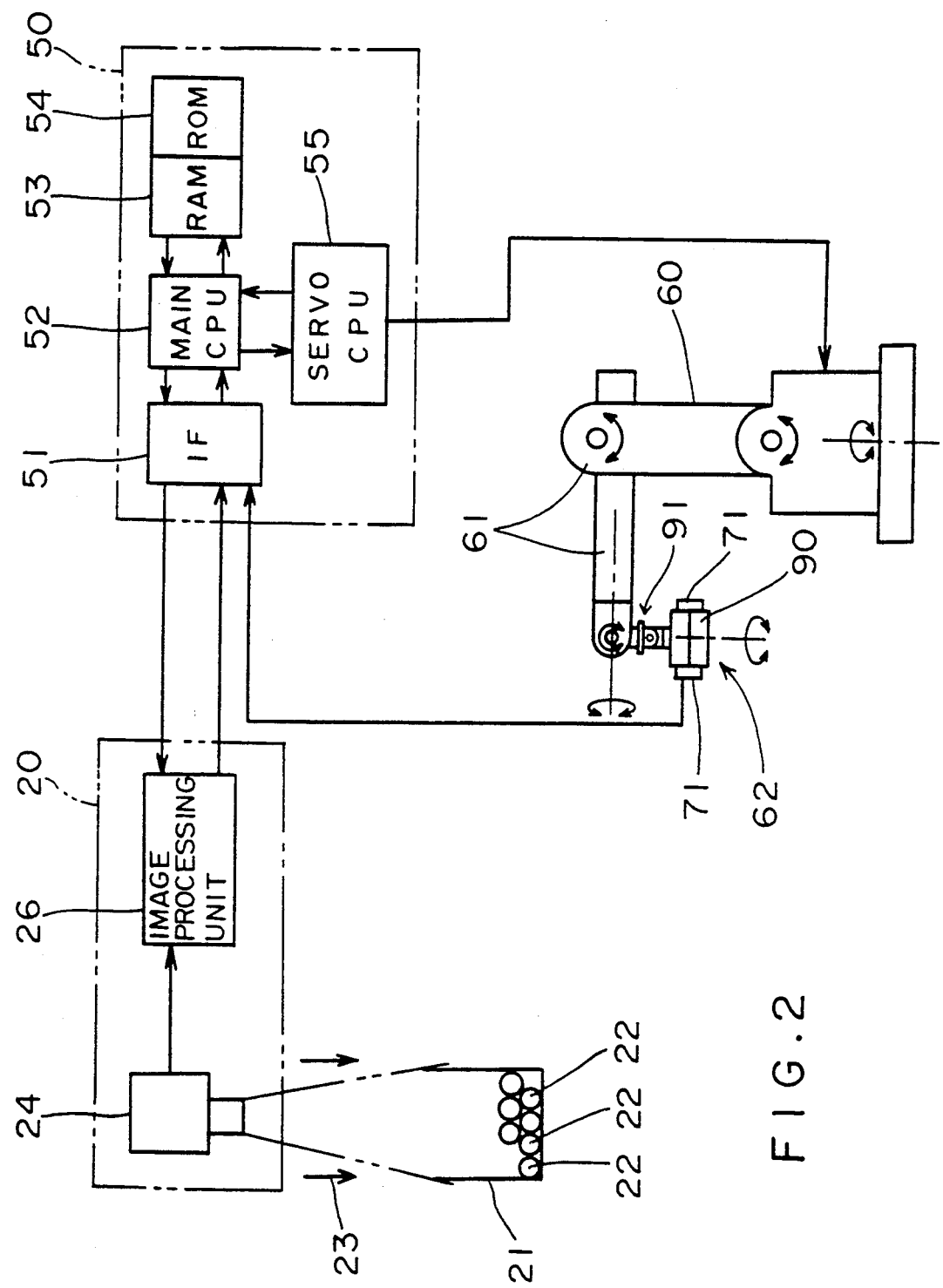

Referring now to the drawings and particularly, to FIG. 2 thereof showing an embodiment of the present invention, a robot system for controlling a robot 60 is composed of a robot controller 50 and a workpiece recognition apparatus 20. Numeral 21 indicates a box in which many cylindrical workpieces 22 are stored. As will be described hereinafter, the robot 60 takes out the workpieces 22 for carrying them to a different location.

The robot 60 is an articulated robot of the six axes type driven by six servomotors (not shown) which are controlled by the robot controller 50. The robot is provided with a hand 62 having an electric magnet 90, as shown in FIGS. 3 (a) and 3 (b). The hand 62 is attached to the wrist portion of the robot 60 through a floating mechanism 91. The wrist portion is rotatable about its center axis, as shown in FIG. 2 The electric magnet 90 has a rectangular shape, and the front end surface thereof has a concavely curved shape conforming to the outer shape of a workpiece to be picked up. The floating mechanism 91 is composed of a bracket 8 fixed to a flange 7 of the wrist portion, a connection link 10, and pins 11 and 12. The bracket 8 is formed with an elongated hole 8a extending in a vertical direction. The connection link 10 is swingably supported by the bracket 8 via the upper pin 11 which penetrates the elongated hole 8a, and whose one end is fixed to the upper portion of the connection link 10. The hand 62 is supported by the connection link 10 via the lower pin 12 to be swingable about the pin 12. With this floating mechanism, the hand 62 is allowed to move vertically and to swing about the axis of the pin 12.

Also, the hand 62 is provided with a pair of contact sensors 71. Each of the sensors 71 outputs a detection signal when the contact pin 71a contacts the workpiece 22. Using these two sensors 71, it is possible to confirm whether or not the front surface of the electric magnet 90 contacts the workpiece 22 properly.

The robot controller 50 is mainly composed of a main CPU 52, a RAM 53, a ROM 54 and a servo CPU 55. The workpiece recognition apparatus 20 is connected to the main CPU 52 through an interface 51, while the contact sensors 71 fixed to the hand 62 are also connected to the main CPU 52 though the interface 51 so that the detection signals are transmitted from the sensors 71 to the main CPU 52. The ROM 54 memorizes a position control program for controlling the robot 60 and other programs, and the RAM 53 memorizes data such as teaching data. The servo CPU 55 controls the six servomotors of the robot 60 in accordance with command sent from the main CPU 52.

The workpiece recognition apparatus 20 is mainly composed of a CCD video camera 24 and an image processing unit 26. The video camera 24 outputs a video signal indicating the image of the workpieces 22, while the image processing unit 26 finds an outline shape of selected one of the workpieces 22 from the video signal so as to calculate the center position of the selected workpieces as an existing position. In this embodiment, the existing position is expressed by the coordinate values Xw and Yw in a vision coordinate system, as shown in FIG. 4 (a). Although the workpieces 22 are put side by side in the box 21, postures of workpieces 22 slightly differ from each other. Therefore, each of the workpieces 22 can be regarded as a cylindrical object which inclines by an unknown amount $\theta$ with respect to the X direction of the vision coordinate system. A parallel light beam 23 is emitted vertically toward the box 21 from a position located above the box 21. The video camera 24 detects a light beam reflected from the workpieces 22 so as to output an image signal to the image processing unit 26.

The operation of the robot control system will be explained hereinafter with reference to flow charts shown in FIGS. 5 through 8.

Figure 5:
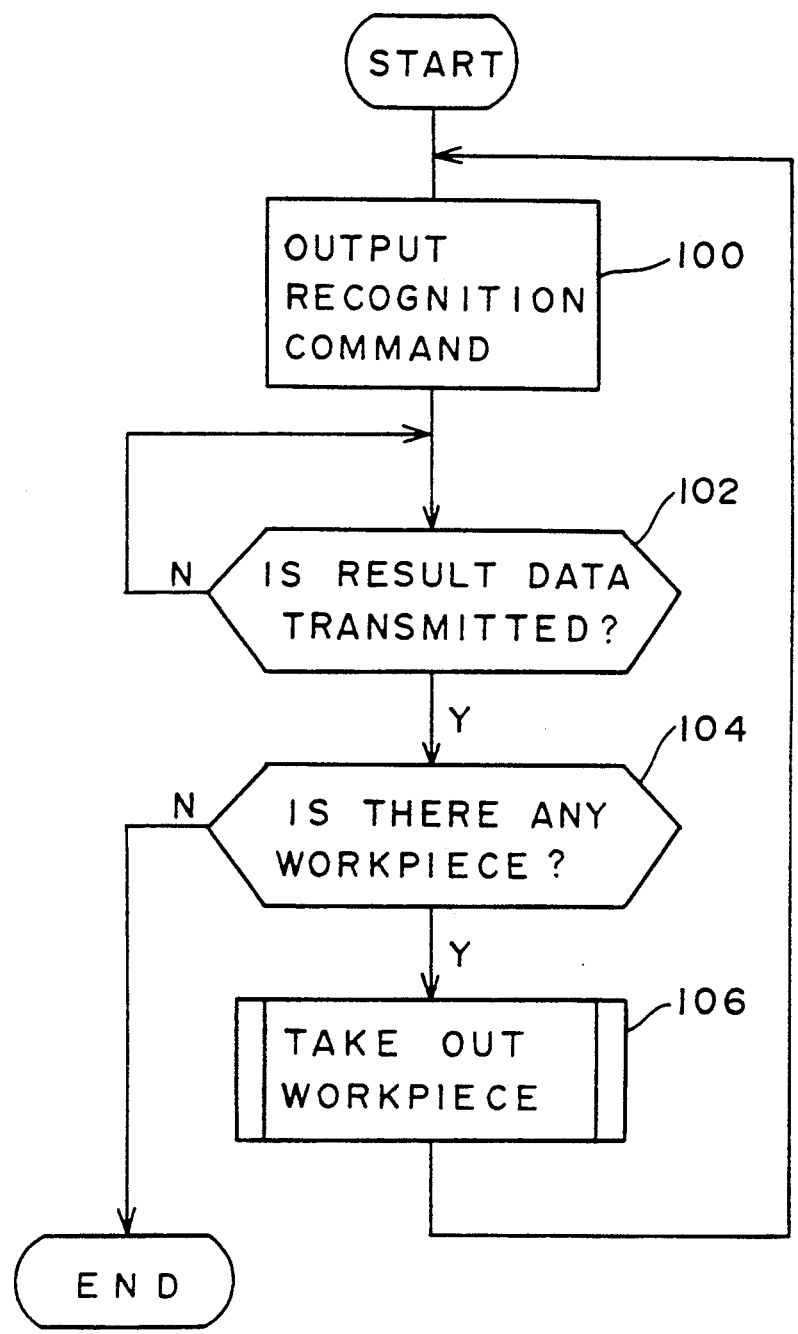

FIG. 5 shows the operation of the main CPU 52 of the robot controller 50. First, a recognition command signal is outputted to the recognition apparatus 20 at step 100. As will be explained hereinafter, in response to the recognition command, the recognition apparatus 20 detects the existing position of selected one of the workpieces, and sends to the main CPU 52 result data indicating a pick-up movement start position Ps and a pick-up movement end position Pe. The recognition apparatus 20 also determines a desired approach posture of the hand 62 during picking up operation. Vector data indicating the desired approach posture are also included in the result data sent to the main CPU 52. When it is detected that there is no workpiece in the box 22, the recognition apparatus 20 sends to the main CPU 52 data indicating such condition. At step 102, the main CPU 52 judges whether or not the result data is transmitted from the recognition apparatus 20. When the data is transmitted from the recognition apparatus 20, the process moves to step 104 to judge, based upon the result data, whether or not there are any workpieces 22 in the box 21. When it is judged that there is no workpiece in the box 21, the picking up operation is stopped. When it is judged that there is any the workpiece 22 is in the box 21, the process moves to step 106 to causes the robot 60 to pick up selected one of workpieces 22. When the electric magnet 90 of the hand 62 contacts with the selected workpiece perfectly, both the two contact sensors 71 output detection signals in response to which the main CPU 52 causes the robot 60 to take out the selected workpiece 22. After that, the process goes back to the step 100 to repeat above-mentioned process to take out another workpiece.

Figure 7:
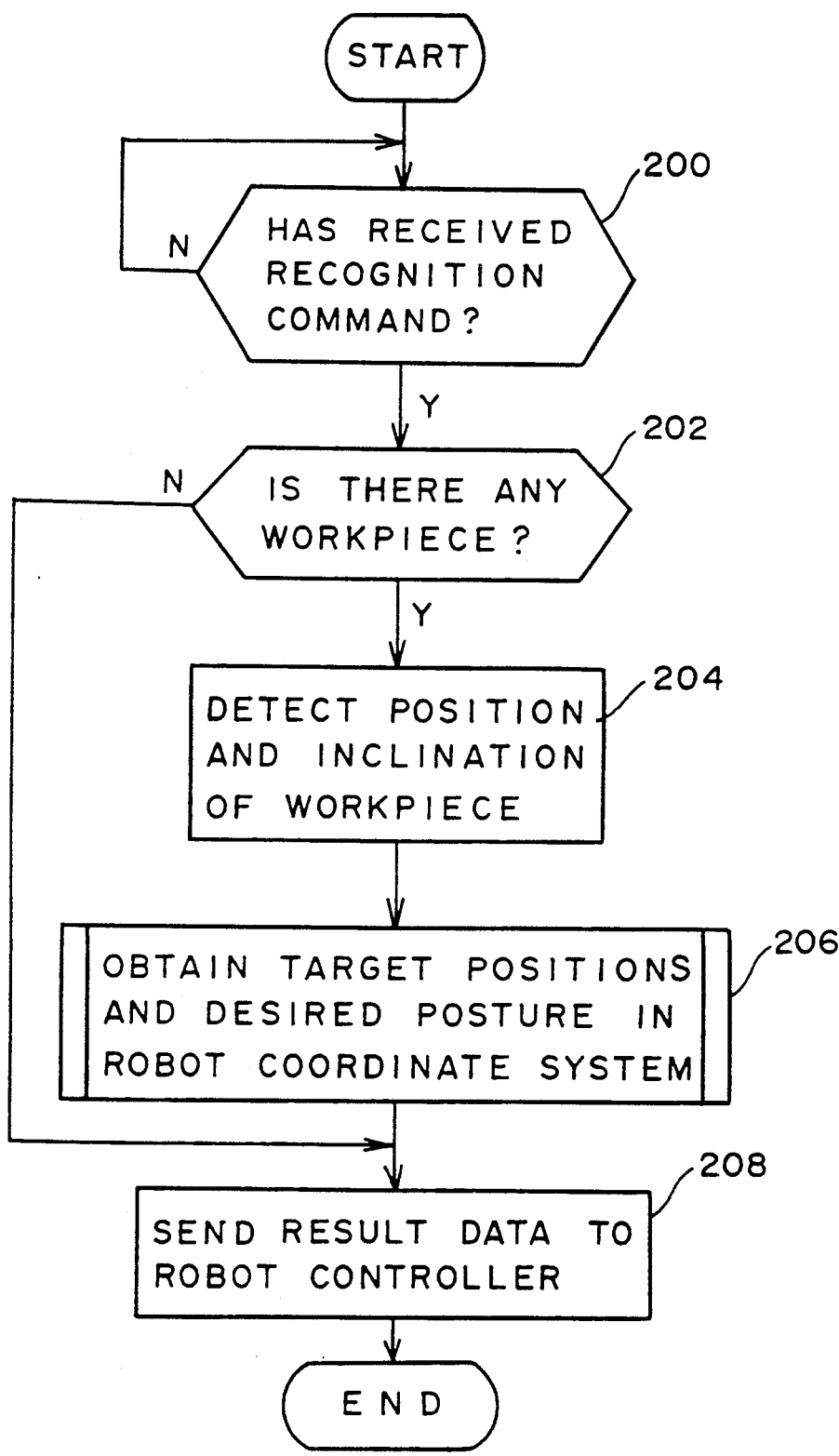

FIG. 7 shows the operation of the image processing unit 26 of the recognition unit 20.

At step 200, it is judged whether or not a recognition command is outputted from the main CPU 52. When the command is outputted, the processing moves to step 202. On the contrary, when the command is not outputted, the processing unit 26 waits at step 200 until the command is outputted.

At step 202, it is judged whether or not there is any workpiece in the box 21. At this step, the image data indicating the inside of the box 21 taken by the video camera 24 is read in by the processing unit 26, and then existence of the workpiece is confirmed depending on the image signal. When it is judged that there is any workpiece in the box 21, the process moves to step 204. When it is judged that there is no workpiece in the box 21, the process jumps to step 208 to output result data indicating that there is no workpiece in the box 21.

At step 204, the processing unit 26 obtains the existing position (Xw, Yw) and the inclination ($\theta$) of selected one of workpieces 22 in the vision coordinate system.

At step 206, two sets of positions (Pxw1, Pyw1, Pzw1) and (Pxw2, Pyw2, Pzw2) are calculated based upon the position (Xw, Yw) and the inclination ($\theta$) of the selected workpiece 22 obtained at step 204. The position (Pxw1, Pyw1, Pzw1) is a pick-up movement start position Ps, as shown in FIG. 10, in the robot coordinate system whose origin is fixed to the base of the robot 60, while the position (Pxw2, Pyw2, Pzw2) is a pick-up movement end position Pe in the robot coordinate system. Further, a set of vector data indicating a desired posture of the hand 62 are calculated at the step 206.

At step 208, the result data including the positions Ps and Pe, and the vector data are sent to the main CPU 52 of the robot controller 50.

Figure 8A:
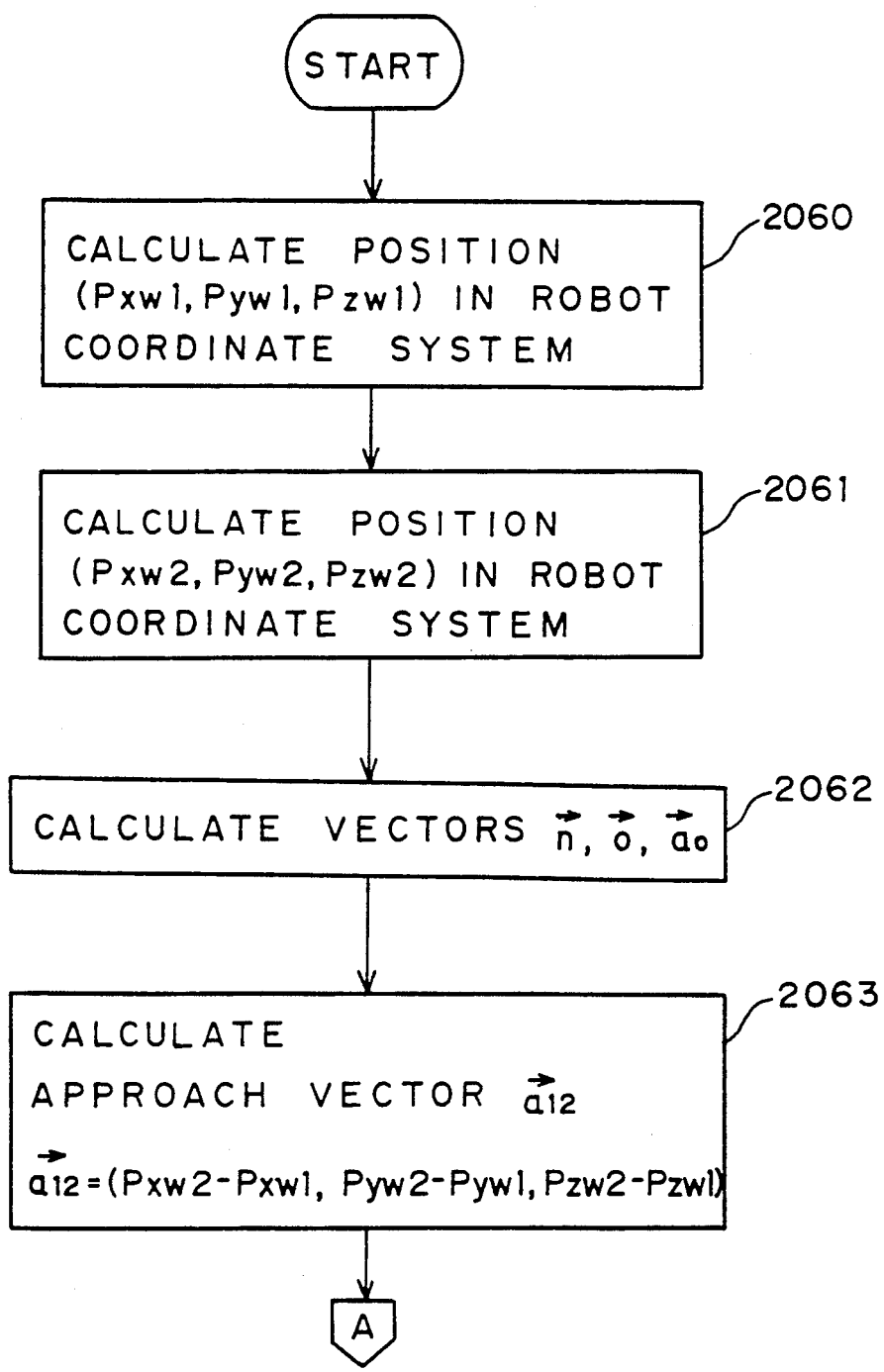
Figure 8:
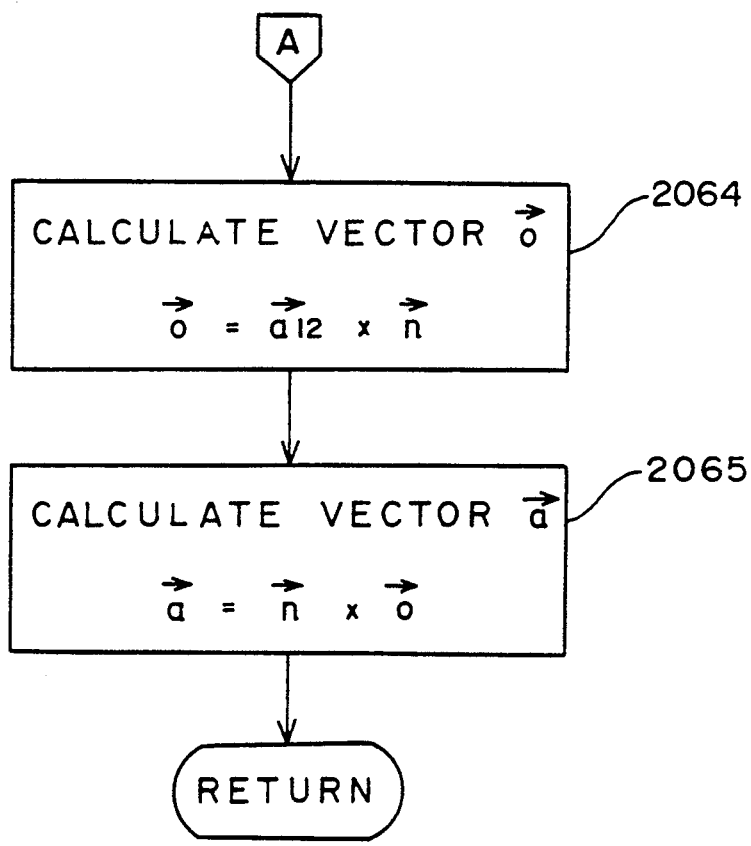

The detailed process at the step 206 will be described hereinafter with reference to a flow chart shown in FIGS. 8 (a) and 8 (b), and charts shown in FIGS. 4 (a) and 4 (b). A desired posture of the hand 62 at the pick-up movement start position Ps is a posture with which the hand 62 approaches to the selected workpiece 22 to pick up it, and is expressed by vectors n̄, ō and ā, as shown in FIG. 3 (b). The posture is shown as being inclined with respect to a vertical plane V containing the longitudinal axis of the selected workpiece 22 (FIG. 9(b)). The vector ā is an approach vector indicating an approach direction of the wrist portion, and the floating plane FLP of the hand 62 is parallel to the approach vector ā. The approach vector ā coincides with the center axis of the wrist portion. The the vector $\bar{o}$ is an orient vector perpendicularly intersecting with the approach vector $\bar{a}$ and the floating plane FLP of the hand 62 and indicating the direction of the wrist portion. The vector $\bar{n}$ is a normal vector parallel to the floating plane FLP, but perpendicularly intersects with the vectors $\bar{a}$ and $\bar{o}$. The line of intersection of the floating plane FLP with the vertical plane V is parallel to the normal vector $\bar{n}$, as shown in FIG. 9(b). The inventors of the present invention have discovered that in cases where the line of intersection L of the floating plane FLP with the vertical plane is not parallel to a horizontal direction, or the center axis Ow of the wrist portion is not perpendicular to the line L in the event that the line L is parallel to the horizontal direction, the hand 62 swings down from its center position, as shown in FIG. 1 (b), when the hand 62 is inclined, and that the hand 62 does not swing down from its center position when the line L of intersection of the floating plane FLP of the hand with the vertical plane is parallel to a horizontal direction and the center axis of the wrist portion, namely the approach vector $\bar{a}$ is perpendicular to the line L.

At first step 2060, the existing position (Xw, Yw) of the selected workpiece 22 obtained at the step 204 is converted to the pick-up movement start position Ps (Pxw1, Pyw1, Pzw1) in the robot coordinate system using the calibration function. The calibration function is a function to convert position data in the vision coordinate system to position data in the robot coordinate system taking consideration of the relationship between the vision coordinate system and robot coordinate system, and the magnification of the video camera 24. In this case the conversion is carried out under the assumption that the height of the selected workpiece W is Pz1 which is higher than the box 21 by a predetermined amount.

The calculation accomplished at the step 2060 is as follows, wherein $\alpha$ is an angle between the Px axis of the robot coordinate system and the X axis of the vision coordinate system, and $\theta$ is an angle between the longitudinal axis of the workpiece 22 and the X axis of the vision coordinate system.

$$Pxw1 = Xw \cdot \cos \alpha - Yw \cdot \sin \alpha$$

$$Pyw1 = Xw \cdot \sin \alpha + Yw \cdot \cos \alpha$$

$$Pzw1 = k \text{ (constant value)}$$

At next step 2061, the existing position (Xw, Yw) of the selected workpiece 22 obtained at the step 204 is converted to the pick-up movement end position (Pxw2, Pyw2, Pzw2) in the robot coordinate system using the calibration function. In this case the conversion is carried out under the assumption that the height of the selected workpiece W is Pz2 which is lower than the box 21 by a predetermined amount.

Figure 9:
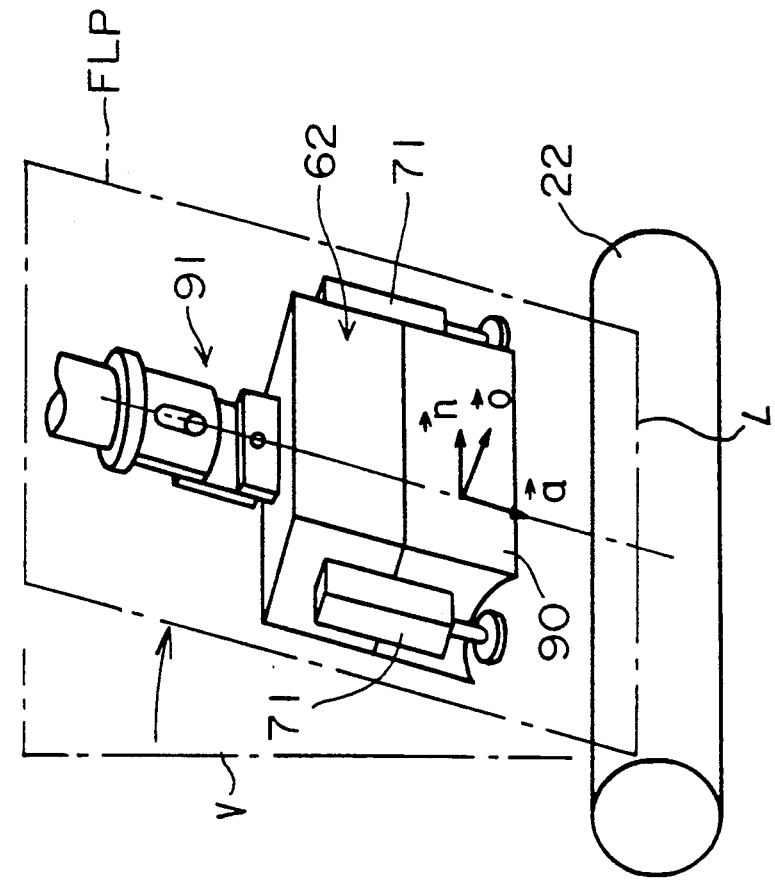
Figure 9:
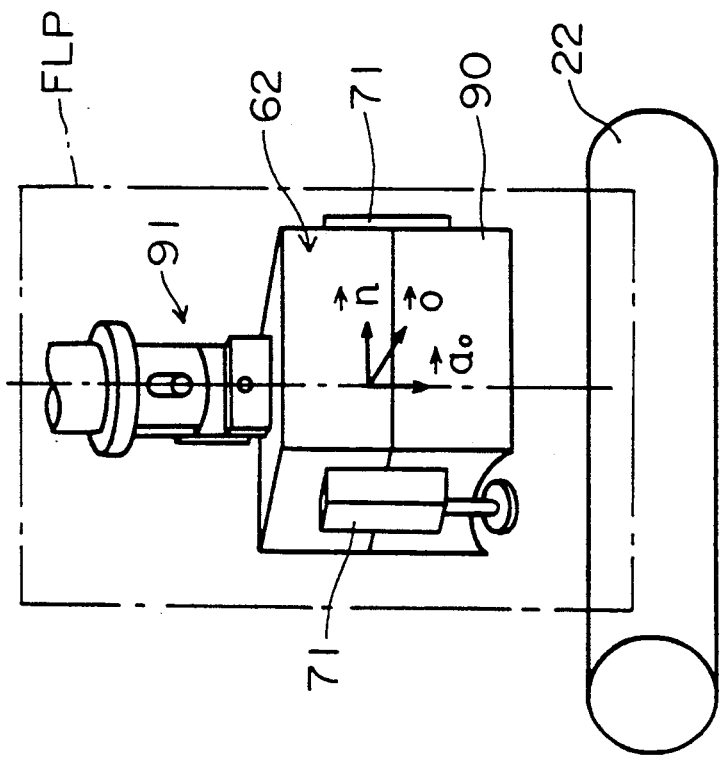

Further, at step 2062, vectors $\bar{n}$, $\bar{o}$, $\bar{a}_0$ defining a base approach posture of the hand 62 are determined based on the inclination ($\theta$) of the selected workpiece 22 as follows. Namely, a base approach vector $\bar{a}_0$ is determined in such a way that the base approach vector $\bar{a}_0$ becomes parallel to a vertical direction, while the normal vector $\bar{n}$ is determined in such a way that the normal vector $\bar{n}$ becomes parallel to the longitudinal axis of the workpiece 22, as shown in FIG. 9 (a). The calculation accomplished at the step 2062 is as follows, wherein $\alpha$ is an angle between the Px axis of the robot coordinate system and the X axis of the vision coordinate system, and $\theta$ is an angle between the longitudinal axis of the workpiece 22 and the X axis of the vision coordinate system.

$$n = (\sin \alpha \cdot \sin \theta - \cos \alpha \cdot \cos \theta, -\sin \alpha \cdot \sin \theta - \cos \alpha \cdot \cos \theta, 0)$$

$$o = (-\cos \alpha \cdot \sin \theta - \sin \alpha \cdot \cos \theta, \cos \alpha \cdot \cos \theta - \sin \alpha \cdot \sin \theta, 0)$$

$$a_0 = (0, 0, -1)$$

At step 2063, an approach vector a12 is calculated using the following expression.

$$a12 = (Pxw2 - Pxw1, Pyw2 - Pyw1, Pzw2 - Pzw1)$$

At step 2064 in FIG. 8 (b), the orient vector $\bar{o}$ indicating the direction of the hand 62 is obtained by cross product of the vectors a12 and $\bar{n}$, as follows.

$$o = a12 \cdot n$$

At step 2065, the approach vector $\bar{a}$ is calculated by cross product of the vector $\bar{o}$ and the vector $\bar{n}$, as follows.

$$a = n \cdot o$$

With this calculation, vectors $\bar{a}$, $\bar{o}$, $\bar{n}$ indicating a desired posture of the hand 62 are decided such that the vector $\bar{n}$ becomes parallel to the longitudinal axis of the workpiece 22 and is parallel to a horizontal direction, and the approach vector $\bar{a}$ coincides with the line connecting between the video camera 24 and the selected workpiece 22. FIG. 9 (b) shows an inclined approach posture determined by the above process.

After above mentioned calculation, the image processing unit 26 outputs result data indicating the pick-up movement start positions Ps (Pxw1, Pyw1, Pzw1), the pick-up movement end positions Pe (Pxw2, Pyw2, Pzw2) and the vectors $\bar{a}$, $\bar{n}$ and $\bar{o}$.

When the result data is transmitted from the image processing unit 24, the main CPU 52 of the robot controller 50 controls the servomotors of the robot 60, at step 106 of the flow chart shown in FIG. 5, in such a way that the hand 62 approaches toward the selected workpiece 22 with the desired approach posture defined by the vectors. As a result, the selected workpiece 22 is perfectly held by the electric magnet 90 of the hand 62.

Figure 6:
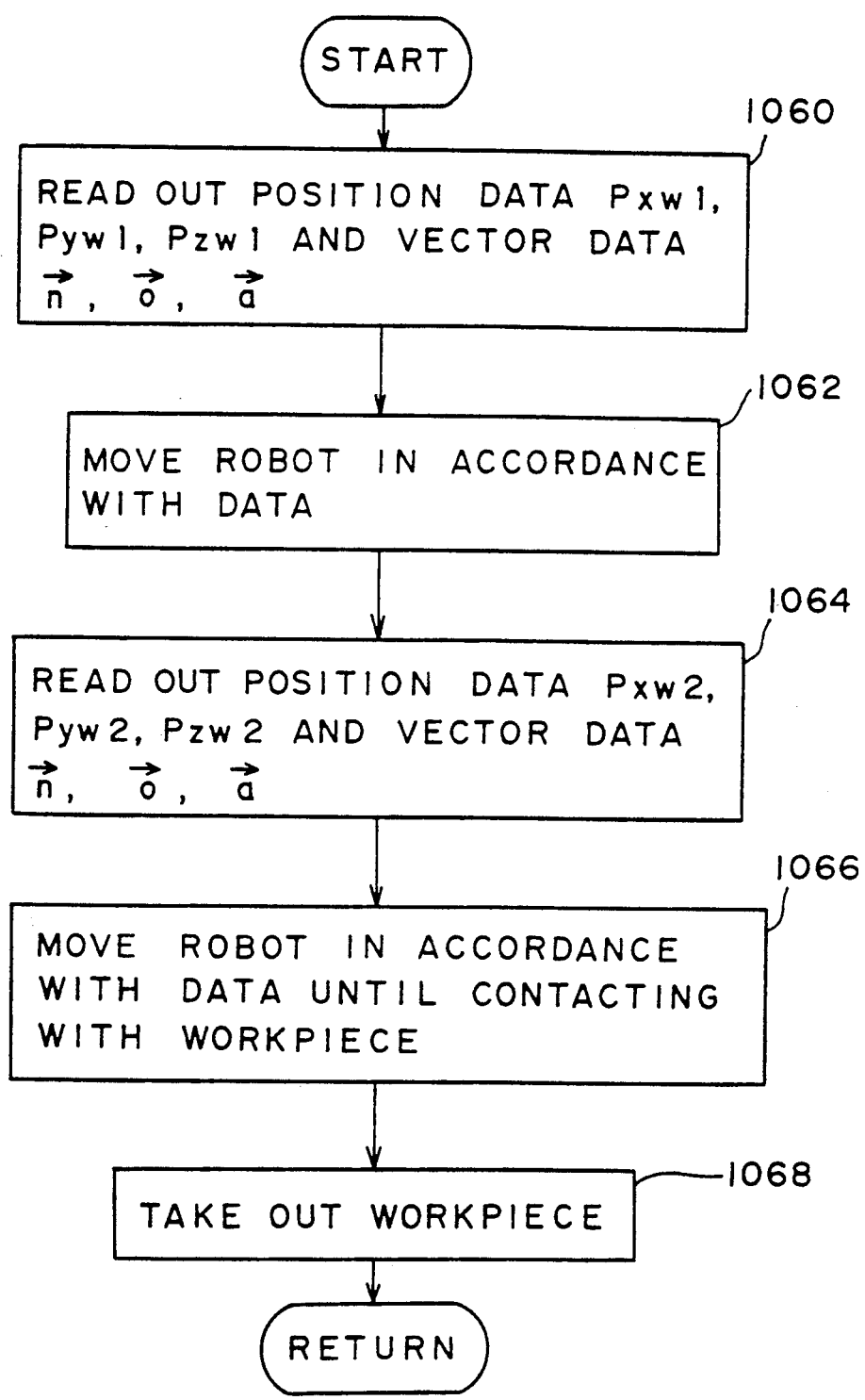

FIG. 6 shows the detail process at the step 106. It is to be noted that the hand 62 is initially located at a predetermined original position Po. In this condition, the hand 62 is locked by a lock mechanism (not shown) in such a way that the direction of the hand 62 coincides with the approach vector of the wrist portion. At first step 1060, the data indicating the pick-up movement start position Ps (Pxw1, Pyw1, Pzw1) and the vectors $\bar{a}$, $\bar{n}$ and $\bar{o}$ are read out by the main CPU 52 from a buffer memory area. After that the servomotors of the robot 60 are driven, at step 1062, in accordance with the data, so that the hand 62 is moved to pick-up movement start position Ps (Pxw1, Pyw1, Pzw1) at a predetermined rapid speed, and the posture of the hand 62 is changed in accordance with the vectors $\bar{a}$, $\bar{n}$ and $\bar{o}$ simultaneously. As a result, the normal vector of the wrist portion becomes parallel to the longitudinal axis of the workpiece 22, and the approach vector of the wrist portion coincides with the line connecting between the video camera 24 and the selected workpiece 22. The posture of the hand 62 after above operation is indicated by a solid line in FIG. 10. After this operation, the hand 62 is released by inactivating the lock mechanism so that the hand is allowed to swing in the floating plane. At step 1064, the data indicating the pick-up movement end position Ps (Pxw2, Pyw2, Pzw2) and the vectors $\bar{a}$, $\bar{n}$ and $\bar{o}$ are read our by the main CPU 52 from the buffer memory area. After that the servomotors of the robot 60 are driven, at step 1066, in accordance with the data, so that the hand 62 is moved toward pick-up movement end position Pe (Pxw2, Pyw2, Pzw2) at a predetermined approach speed. Since the vectors $\bar{a}$, $\bar{n}$ and $\bar{o}$ are not changed, the hand 62 is moved from the pick-up movement start position Ps toward the pick-up movement end position Pe with keeping the desired posture. This operation continues until both the contact sensors 71 output the contact signals. When both the contact sensors output the contact signals, the hand 62 is moved back to the pick-up movement start position Ps, at step 1068. After the picking up operation, the workpiece 22 is carried to a different location, and the hand 62 is returned to the original position Po.

Although the hand 62 is approached toward the workpiece 22 along the line connecting the video camera 24 and the workpiece 22 in order to prevent the hand 62 from interfering with the side wall of the box 21, the hand 62 may be approached toward the workpiece 22 along the vertical direction when a large clearance exists between a workpiece to be picked up and the side wall of the box 22.

Obviously, numerous modifications and variations of the present invention are possible in light of the above teachings. It is therefore to be understood that within the scope of the appended claims, the present invention may be practiced otherwise than as specifically described herein.

What is claimed is:

1. A method for picking up a workpiece with a robot having a hand which is supported on a wrist portion of said robot for freely swinging movement in only one floating plane, said method comprising steps of:
    determining a desired inclined posture of said wrist portion in such a way that a line of intersection of said only one floating plane of said hand with a vertical plane becomes parallel to a horizontal direction, and a center axis of said wrist portion becomes perpendicular to said line of intersection;
    changing the posture of said wrist portion in such a way that the posture of said wrist portion coincides with said desired inclined posture; and
    moving said hand toward said workpiece while keeping said desired inclined posture to pick up said workpiece.

2. A method for picking up a cylindrical workpiece, whose longitudinal axis is parallel to a horizontal direction, using a workpiece recognition apparatus and a robot having a hand which is supported on a wrist portion of said robot for freely swinging movement in only one floating plane, said method comprising steps of:
    detecting a position and an inclination of said workpiece in a vision coordinate system;
    converting said detected position of said workpiece into a position of said workpiece in a robot coordinate system, as a target position;
    determining a desired inclined posture of said wrist portion in such a way that a line of intersection of said only one floating plane of said hand with a vertical plane containing the longitudinal axis of said workpiece becomes parallel to a horizontal direction, and a center axis of said wrist portion becomes perpendicular to said line of intersection;
    changing the posture of said wrist portion in such a way that the posture of said wrist portion coincides with said desired inclined posture; and
    moving said hand toward said target position while keeping said desired inclined posture to pick up said workpiece.

3. A method for picking up a workpieces according to claim 2, said determining step comprising steps of:
    calculating a base approach posture in such a way that an approach vector of said wrist portion becomes parallel to a vertical direction, sand said floating plane becomes parallel to the longitudinal axis of said workpiece: and
    modifying said base approach posture to obtain said desired inclined posture in which the approach vector of said wrist portion inclines by a predetermined amount.

4. An apparatus for controlling a robot having a floating hand to pick up a workpiece, wherein said hand is freely swingable in only one floating plane, said apparatus comprising:
    means for determining a desired inclined posture of a wrist portion in such a way that a line of intersection of said floating plane of said only one hand with a vertical plane becomes parallel to a horizontal direction, and a center axis of said wrist portion becomes perpendicular to said line of intersection;
    means for changing the posture of said wrist portion in such a way that the posture of said wrist portion coincides with said desired inclined posture; and
    means for moving said hand toward said workpiece while keeping said inclined posture to pick up said workpiece.

5. A apparatus for controlling a robot according to claim 4, wherein said workpiece is a cylindrical workpiece whose longitudinal axis is parallel to a horizontal direction, and said apparatus further comprises:
    a workpiece recognition apparatus disposed above said workpiece for detecting a position and an inclination of said workpiece in a vision coordinate system; and
    means for converting said detected position of said workpiece into a position of said workpiece in robot coordinate system to obtain a target position, said moving means moving said hand toward said target position with keeping said inclined posture to pick up said workpiece.

6. An apparatus for controlling a robot according to claim 5, wherein said determining means is composed of:
    means for calculating a base approach posture in such a way that the approach vector of said wrist portion becomes parallel to a vertical direction, and said floating plane of said hand becomes parallel to the longitudinal axis of said workpiece; and
    means for modifying said base approach posture to obtain a desired inclined posture in which the approach vector of said wrist portion inclined by a predetermined amount.

7. An apparatus for controlling a robot according to claim 6, wherein said modifying means modifies said base approach posture to obtain said inclined posture in which the approach vector of said wrist portion becomes parallel to a line connecting said workpiece recognition apparatus and said workpiece.

* * * * *